United States Patent
Christen

(10) Patent No.: US 6,927,183 B1
(45) Date of Patent: Aug. 9, 2005

(54) REINFORCED ARTICLE

(75) Inventor: Dennis Christen, Columbus, TX (US)

(73) Assignee: Diversitech Corporation, Duluth, GA (US)

( * ) Notice: Subject to any disclaimer, the term of this patent is extended or adjusted under 35 U.S.C. 154(b) by 108 days.

(21) Appl. No.: 10/234,630

(22) Filed: Sep. 4, 2002

(51) Int. Cl.[7] .............................. B32B 5/18; B32B 5/24; E04C 1/00; E04B 1/94
(52) U.S. Cl. ..................... 442/370; 442/256; 442/374; 442/375; 442/376; 428/70; 428/71; 428/76; 428/121; 428/125; 428/192; 428/339; 428/375; 428/703; 52/309.1; 52/309.4; 52/309.7; 52/309.17
(58) Field of Search .............................. 442/370, 374, 442/375, 386, 309.1; 428/70, 71, 76, 192, 428/339, 375, 703, 125, 121; 52/309.4, 309.7, 52/309.17

(56) References Cited

U.S. PATENT DOCUMENTS

| | | | | |
|---|---|---|---|---|
| 1,358,508 A | * | 11/1920 | Birdsey | ....................... 428/125 |
| 1,526,307 A | * | 2/1925 | Birdsey | ....................... 428/120 |
| 1,576,142 A | * | 3/1926 | Schumacher | ................. 428/125 |
| 1,678,959 A | * | 7/1928 | Schumacher | ................. 428/125 |
| 4,186,536 A | * | 2/1980 | Piazza | ....................... 52/309.12 |
| 4,229,497 A | * | 10/1980 | Piazza | ........................... 428/71 |
| 4,559,263 A | | 12/1985 | Roodvoets | |
| 4,774,794 A | * | 10/1988 | Grieb | .......................... 52/309.7 |
| 4,946,725 A | | 8/1990 | Harlan | |
| 5,209,968 A | | 5/1993 | Sweeney | |
| 5,333,830 A | * | 8/1994 | Millen | .......................... 248/679 |
| 5,728,458 A | | 3/1998 | Sweeney | |
| 6,017,407 A | | 1/2000 | Yates | |
| 6,395,384 B1 | | 5/2002 | Adam | |
| 6,777,063 B2 | * | 8/2004 | Born | .......................... 428/167 |

\* cited by examiner

Primary Examiner—Norca L. Torres
(74) Attorney, Agent, or Firm—Smith, Gambrell & Russell, LLP

(57) ABSTRACT

The present invention provides a reinforced article with an injected inner reinforcing mixture layer deposited between a covering material and a core material.

28 Claims, 10 Drawing Sheets

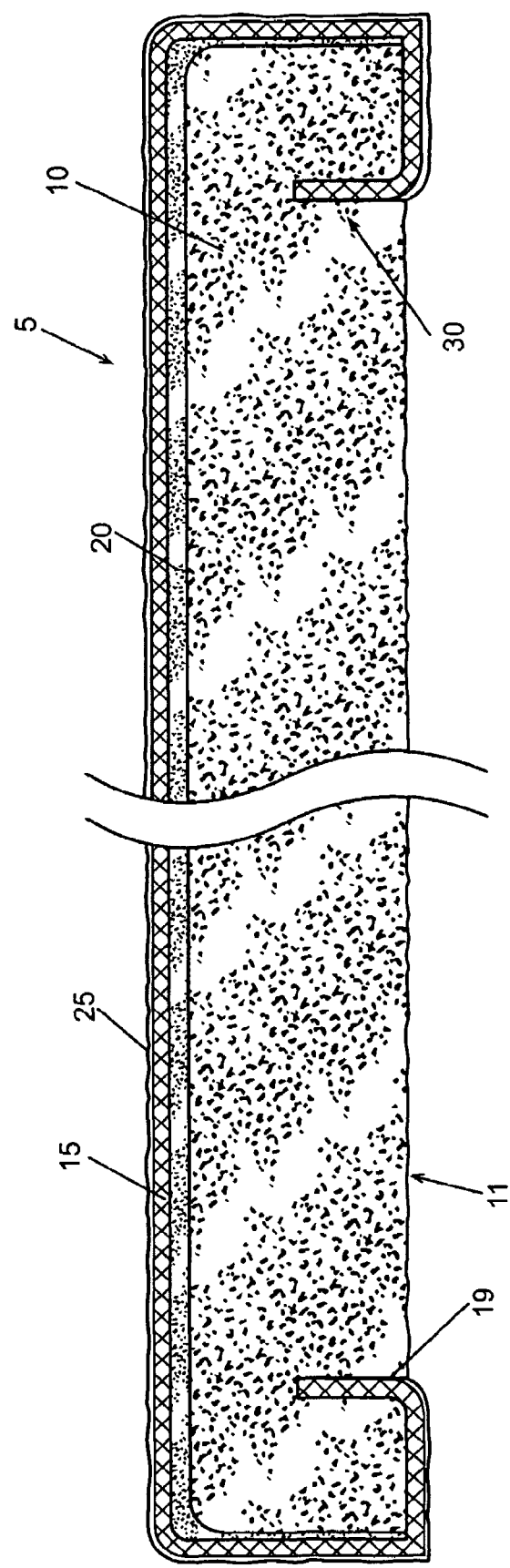

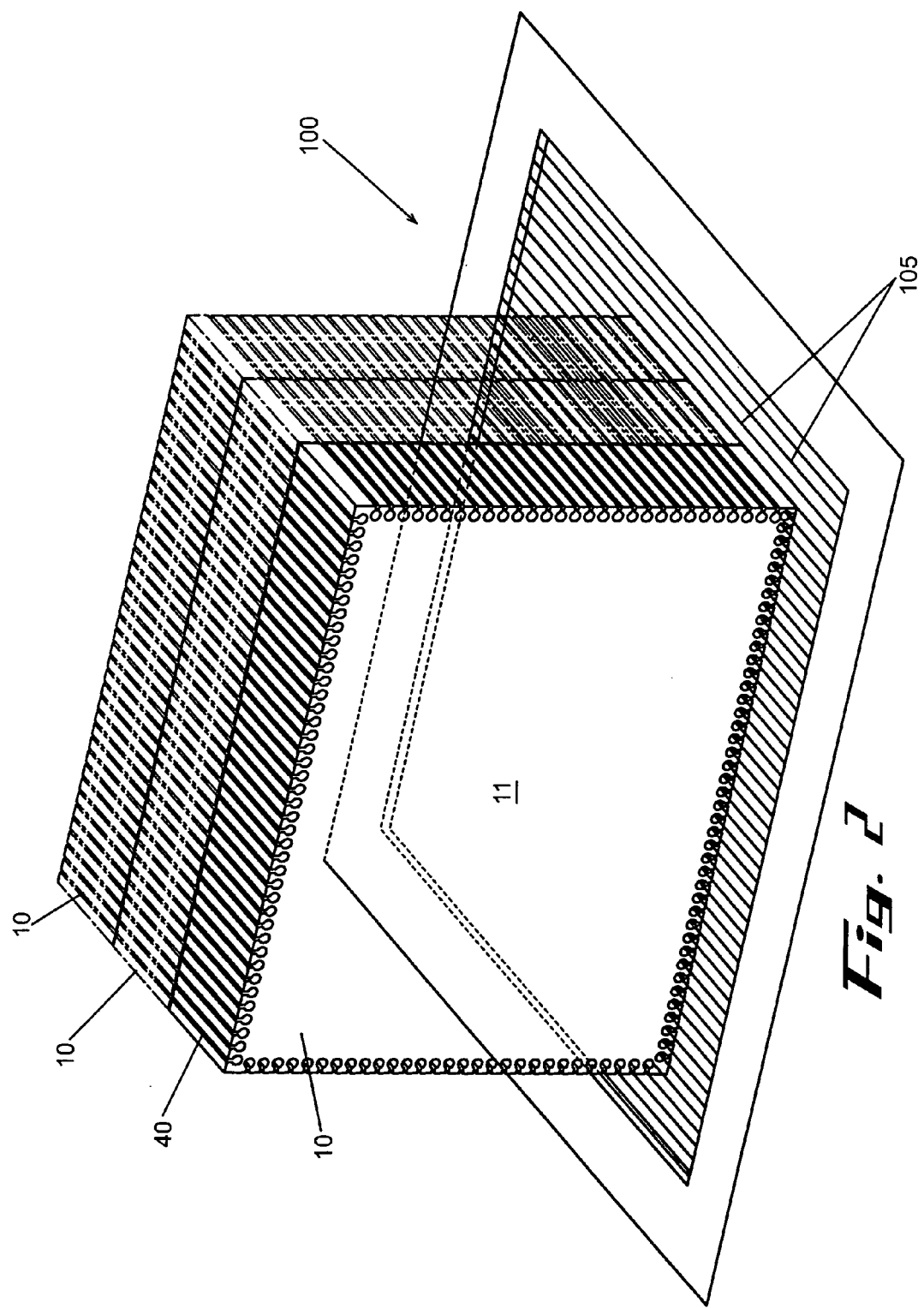

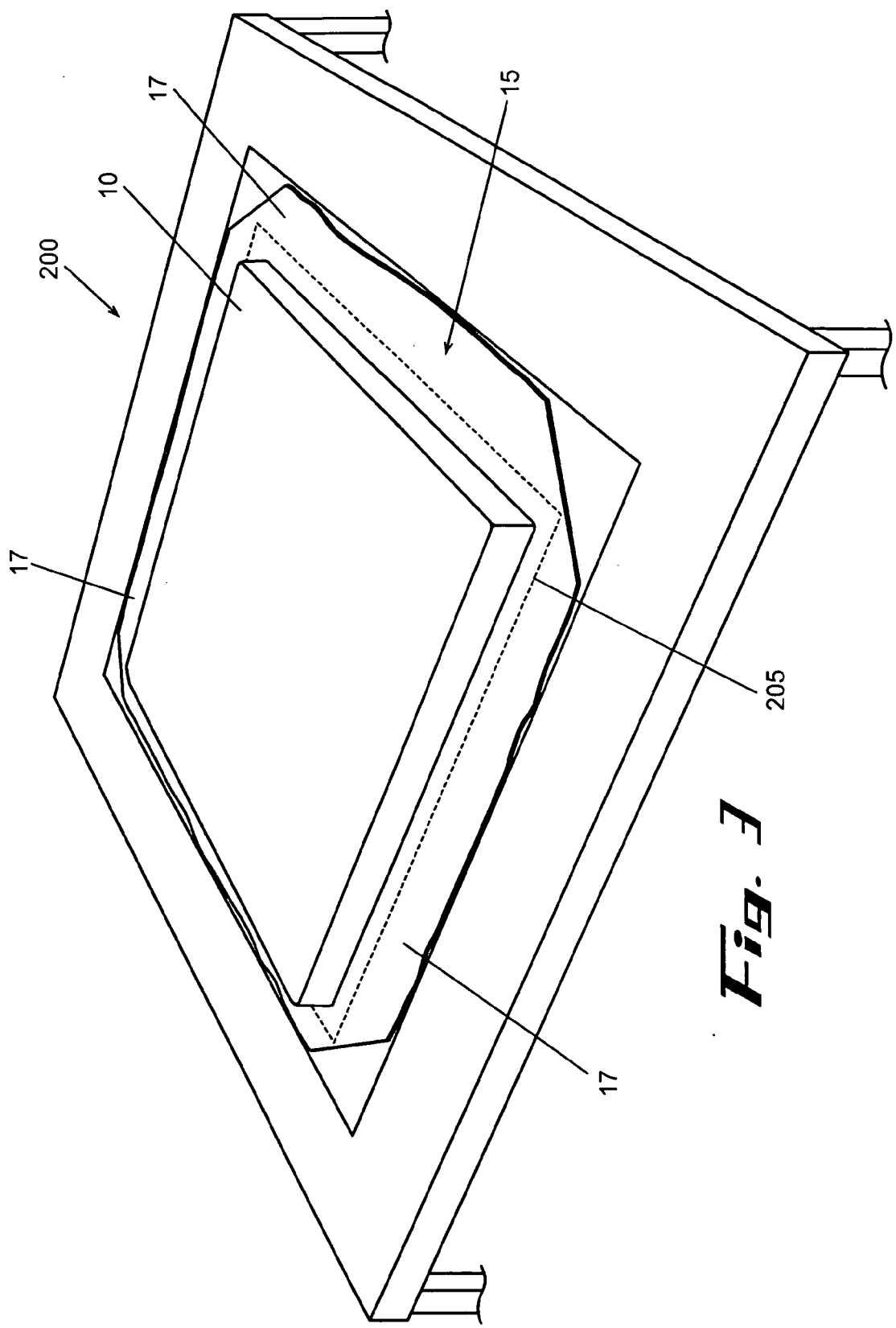

REINFORCED ARTICLE

BACKGROUND

The present invention relates generally to reinforced articles of manufacture that include multi-layered materials, and systems and methods for manufacturing the same.

Examples of reinforced materials are well-known in the art, including U.S. Pat. No. 5,728,458 to Sweeney entitled "Light-Weight High-Strength Composite Pad" and U.S. Pat. No. 5,209,968 to Sweeney entitled "Composite Structure Width Waste Plastic Core And Method of Making Same," both of which are incorporated herein by reference. These examples disclose the use of core materials coated with reinforcing layers for multi-use pads, equipment pads, building panels, and other applications.

Typically, these prior art reinforced layered structures are formed by a sequential outer application process. In these processes, the inner core material is layered by one or more subsequent "outer" layer applications, such that each layer moving outward from the core material must be applied preceding the next outer layer that is applied to the structure. Accordingly, the reinforcement strength and characteristics of the structure are limited by the ability of each succeeding outer layer to bind to the preceding layer.

Accordingly, there is a need for an improved reinforced article and production process that provides greater flexibility for applying reinforcing layers to a core material.

The present invention answers this need by providing a covered core material and method and process for making the same, wherein a reinforcing layer can be injected between a covering material and the core material. The covering material thus secures the reinforcing layer against the core material, and permits further application of reinforcing layers outside of the covering material. Accordingly, the article, process, and system of the present invention provide flexibility of types of core and reinforcing materials, amounts and thickness of reinforcing layers, and the ability to create a variety of shape and sizes for reinforced structures.

SUMMARY OF THE INVENTION

The present invention provides a reinforced article of manufacture comprising a core material covered with covering material, one or more portions of the covering material tucked into the core material, and an inner reinforcing layer of desired compounds and reinforcing characteristics deposited between the covering material and core material.

In an embodiment of the invention a core material comprises expanded polystyrene (EPS) foam, moldable into any desired shape, a fibrous fabric covering material covering the core, and a cement mixture deposited as an inner reinforcing layer.

In embodiments of the present invention, the reinforced article includes one or more optional outer reinforcing layers and/or texture layers deposited on the outside of the covering material surrounding the inner reinforcing layer and core material.

In an embodiment of the invention the outer reinforcing layer is a cement mixture and the texture layer is a solid texture layer such as sand.

The present invention further provides a system and method for manufacturing reinforced articles with a core material covered with a covering material by injecting a desired compound or mixture between the core material and covering material to create an inner reinforcing layer.

In an embodiment of the present invention, the reinforcing layer injection is made through the entire core material until an injection head is positioned between the covering material and core material to deposit the desired compound or mixture as the reinforcing layer.

It is an object of the present invention to provide a method and system where reinforcing characteristics of the inner reinforcing layer can be adjusted by selection of the compound or mixture that is injected, and by metering the amount of compound or mixture injected to create a desired thickness of the inner reinforcing layer.

In a further embodiment of the present invention, receiving channels may be burned or cut to desired depths into a core material surface that is intended to contact the inner reinforcing layer to promote deposition of the inner reinforcing layer mixture into the core material when the inner layer mixture is injected between the core material surface and covering material.

In a further embodiment of the present invention, an automated tucking apparatus is provided on a conveyor system for tucking one or more portions of the covering material into the core material. In one embodiment, the tucking apparatus comprises an automated perforating needle for creating a tucking groove line through the tucked portion of the covering material and core material and an automated plunger for tucking the tucked portion of the covering material into a groove in the core material along the tucking groove line.

In another embodiment of the present invention, a corner trimming station with an automated pincher and welder is provided for trimming excess fabric at the corners of the covered core material by pulling and welding the excess corner fabric. In embodiments of the invention a plurality of pinchers and welders are provided to trim multiple covered corners automatically simultaneously.

BRIEF DESCRIPTION OF THE DRAWINGS

FIG. 2 is a perspective view of a bottom surface of a core material in a stack of core materials with receiving channels being burned at a receiving channel burning station in an embodiment of the present invention.

FIG. 3 is a top perspective view of a core material and covering material being positioned thereon at a covering material template table in an embodiment of the present invention.

FIG. 7 is a top perspective view of a four corner automated weld trimming apparatus in an embodiment of the present invention.

DETAILED DESCRIPTION OF THE INVENTION

The present invention provides a reinforced article and system and method for making the same. Those of ordinary skill in the art will appreciate that an embodiment described herein including an expanded polystyrene (EPS) foam core material with a fabric covering material and cement mixture reinforcing layer is by way of example only, and a variety of alternative materials could be used. In this regard, exemplary covering materials may include fabric, fibrous wrap, webs, mesh, glass mats, paper, and any other types of synthetic or natural fibrous material that is pregnable by a desired reinforcing layer. Core materials include foamable materials such as polyurethane, polyisocyanurate, EPS, other rigid foams, plastics, corks, wood, synthetic polymers, and similar rigid core materials. Those of ordinary skill in the art will further appreciate that such core materials may be molded into virtually any shape or size as may be desired for the reinforced article. The reinforced mixture layer may include mixtures of concrete, plaster, epoxy, synthetic resins, polymers, paint, waterproofing compounds, glues, foams, and similar mixtures or materials capable of injection between a core material and covering material. In this regard, "injection" may include the deposit of the reinforcing material by injection entirely through a core material at any desired angle, or, alternatively, with an appropriate injection head, through the covering material, so as to deposit the reinforcing layer between the covering material and core material.

Figure 1:
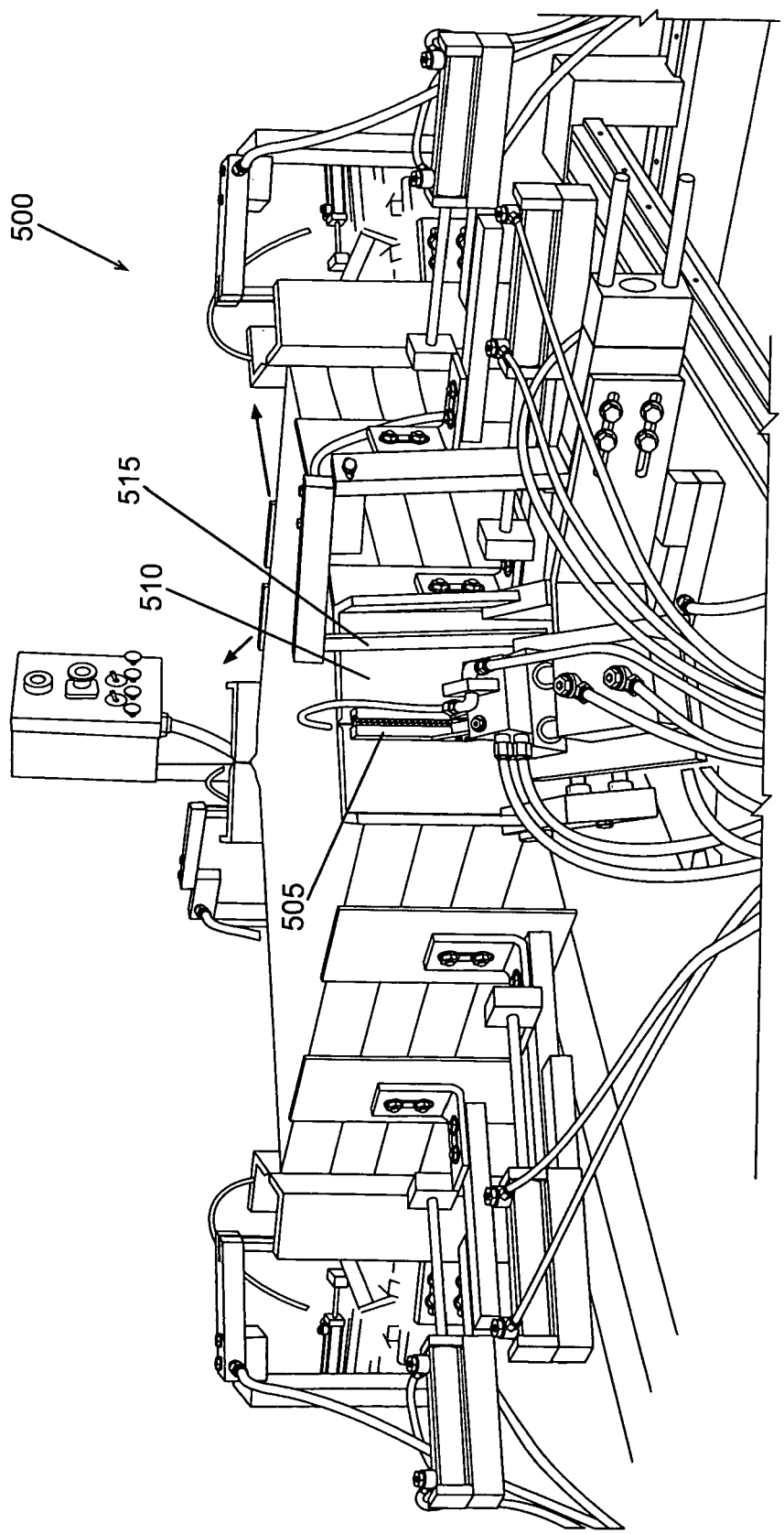
FIG. 1 is a cross-sectional view of a reinforced article in an embodiment of the present invention.

Referring to FIG. 1, a cross section of reinforced article 5 is shown. A core material 10 is surrounded by covering material 15. In an embodiment of the invention, covering material 15 includes fabric woven or non-woven. An inner reinforcing mixture layer 20, including a cement mixture in one embodiment, is provided between the core material 10 and the covering material 15.

Covering material edges 19 are tucked into tucking grooves 30 in the core material 10. The tucked edges 19 keep the covering material 15 tightly surrounding the core material. Further, the tucked edges 19 and tucking groove 30 maximize retention of inner reinforcing mixture layer 20 between core material 10 and covering material 15.

In alternative embodiments, tucking of edges 19 may be replaced or augmented by gluing or other adhesives, taping, stapling, sewing, heat binding, and like methods for adhering edges 19 to the core material 10.

In an embodiment of the invention, the inner reinforcing mixture layer 20 is injected between the core material 10 and covering material 15 after the covering material 15 is secure with tucked edges 19 in tucking groove 30. As described subsequently, a needle head with a dispersion hole may be used for depositing the inner reinforcing mixture layer 20.

In an embodiment of the invention, the inner reinforcing mixture layer 20 is injected as a slurry mixture, such as a cement mixture, concrete mixture, plaster mixture, epoxy mixture, synthetic resin mixture, polymer mixture, paint mixture, or waterproofing mixture and the like, depending on the desired end use of the reinforced article. Such mixtures are preferably metered to deposit such amounts as are necessary to create a desired thickness and characteristics of the reinforcing layer 20 and reinforced article 5. Accordingly, depending on the properties of the mixture deposited for the inner reinforcing mixture layer 20, such mixture is cured to provide the desired reinforcing characteristics of the mixture used.

In alternative embodiments of the invention, one or more outer reinforcing mixture layers 25 may be provided in reinforced article 5. Outer layer 25 may be the same or a different substance from inner layer 20. In an embodiment of the present invention where the reinforced article 5 is an equipment pad, both the inner layer 20 and outer layer 25 are cured cement mixtures. However, optional outer layer 25 may comprise one or multiple layers that include any materials with desired characteristics for reinforced article 5. In embodiments of the present invention, the outer reinforcing mixture layer 25 includes concrete, plaster, epoxy, synthetic resins, polymers, paint, waterproofing compounds, cement, glues, and the like. It will be understood that this is only an exemplary list, and further appreciated that the curing of any applied mixtures, such as slurry mixtures, may be desirable to achieve desired characteristics of the outer reinforcing mixture layer 25.

Figure 10:
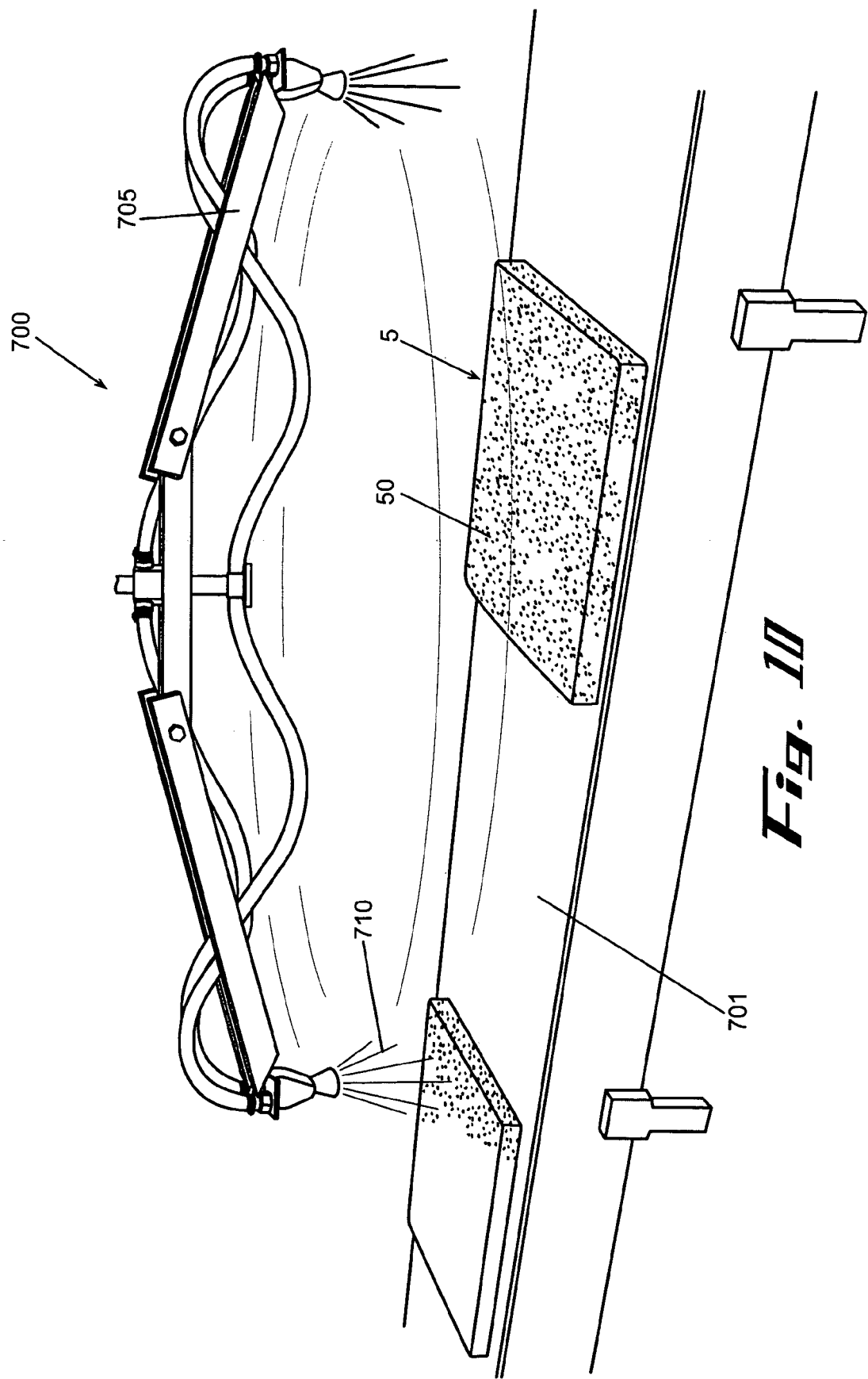
FIG. 10 is a texturizing station in an embodiment of the present invention.

In another embodiment of the present invention, an outer reinforcing layer 25 includes a texture layer 50 (FIG. 10). In one embodiment of the present invention, the texture layer 50 includes a solid substance, such as sand 710 (FIG. 10), but may include virtually any solid with desired texture and binding characteristics with outer layer 25.

In embodiments of the present invention where covering material 15 is a fabric or other fibrous material, inner layer 20 and optional outer layers 25 and texture layer 50, at least in part, impregnate the covering material 15 to bind and create the desirable reinforced surface layers surrounding core material 10 of reinforced article 5.

Referring to FIG. 2, in an embodiment of the present invention, core material 10 includes inner reinforcing layer receiving channels 40. Where core material 10 is EPS foam, the receiving channels 40 are burned at a receiving channel burning station 100.

The receiving channel burning station includes hot wire burners 105 on which the core material 10 is placed to burn the receiving channel 40.

The receiving channels 40 are burned on any surface of the core material which will contact the inner reinforcing mixture layer 20 and be surrounded by covering material 15. For instance, the receiving channels may be burned along all surfaces of the core material 10, or along side surfaces 15, or top surfaces and side surfaces, or any combinations thereof.

The receiving channels 40 permit greater deposition of the inner reinforcing mixture layer 20 than a mere flat surface. Accordingly, the depths of the receiving channels 40 may be increased or decreased for the desired purpose of the reinforced article 5 and reinforcing characteristics of the inner layer 20.

As shown in FIG. 2, the core material may be stacked as a plurality of core materials to burn receiving channels on multiple core materials' 10 surfaces at once. The stack is rotated to each desired receiving channel burning surface for burning on hot wires 105. In this embodiment, it will be appreciate that front and back surfaces may be burned with receiving channels 40 by separating each individual core material 10 from the stack to burn the desired surface.

Further, depending on the properties and material of the core material 10, receiving channels 40 may be formed by alternative methods such as cutting, drilling and boring.

In an embodiment of the present invention for manufacturing a reinforced pad, the receiving channels 40 are preferably burned into a top surface (not shown) and side surfaces of a core material 10 made of EPS foam.

Referring again to FIG. 1, with continuing reference to FIG. 2, the inner reinforcing mixture layer 20 of cement mixture forms a layer on the top and side surfaces of the core material and between the covering material 15. In this embodiment, the covering material is preferably pregnable fibrous fabric and the tucked ends 19 sustain the inner reinforcing layer 20 around the top and side surface of the core material 10 to also promote deposition of the inner reinforcing mixture layer 20 into the receiving channels 40 of the top and side surfaces. In this embodiment, the receiving channels 40 are preferably 1/8" wide by 1/4" deep.

Referring to FIG. 3, a covering material application station 200 is shown. In embodiments where optional receiving channels 40 are utilized, the core material 10 is covered with covering material 15 after forming the receiving channels 40. Alternatively, where receiving channels 40 are not desired, the covering material is applied prior to injection of inner reinforcing mixture layer 20.

In an embodiment of the present invention, the covering material application station provides proper alignment of fabric covering material 15. A fabric template 205 is sized to the shape of the core material 10 so that the core material is centered on the fabric covering material 15. The fabric application station 200 is preferably a light table wherein the fabric template includes a template periphery for aligning the fabric covering material 15.

Once the core material is centered on the fabric covering material 15, the flaps 17 of the fabric are folded over the core material 10.

Figure 4:
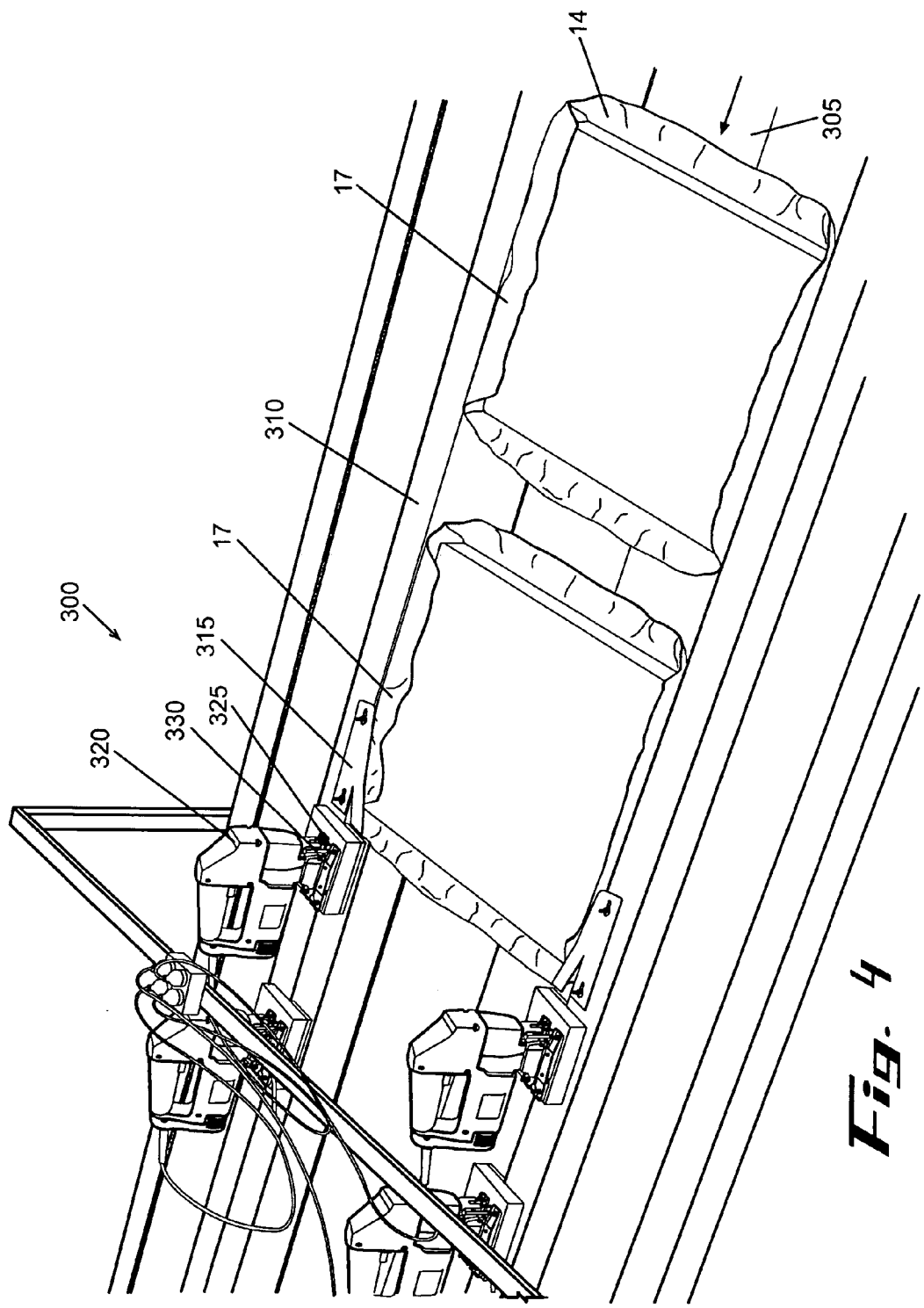
FIG. 4 is a top perspective view of a covering material tucking station in an embodiment of the present invention.

Referring to FIG. 4, the core material 10 including the folded flaps 17 of covering material 15 is placed in covering material tucking station 300.

The tucking station 300 includes a conveyor belt 305 for directing a plurality of covered core materials to a tucking apparatus 320. As shown in FIG. 4, two pairs of tucking apparatuses 320 are used in one embodiment of the invention to tuck flaps 17 into tucking grooves 30 (FIG. 1) as folded edges 19 (FIG. 1).

On opposite sides of the conveyor belt 305, flap rail guides 310 are provided for maintaining the folded flaps in a desired position against core material 10. The rail guides 310 terminate at flap folder 315 as the covered core material 10 is directed at each opposite flap 17 to tucking apparatus 320.

Figure 5:
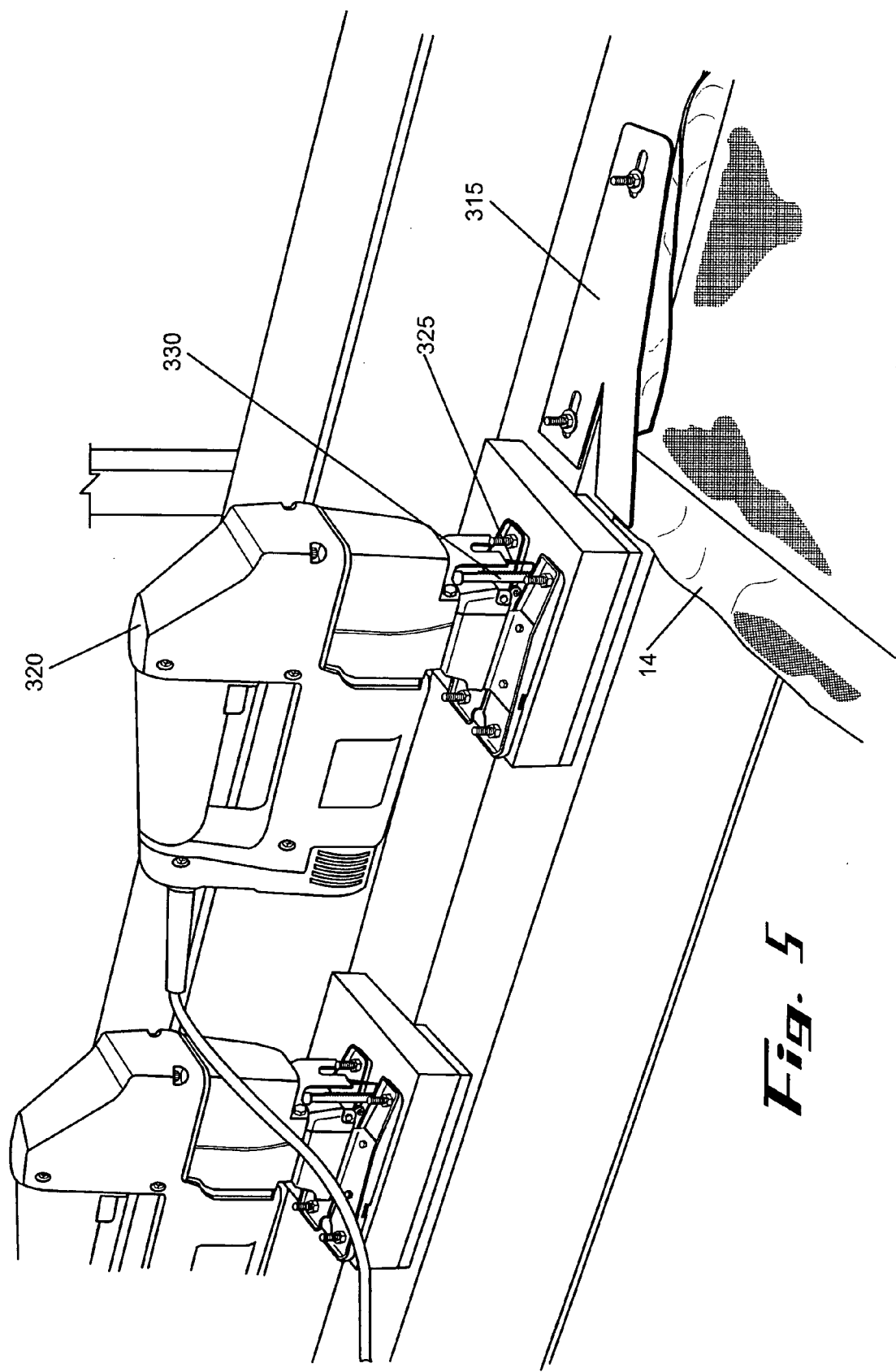
FIG. 5 is a perspective view of a tucking apparatus including an automated tucking needle and plunger in an embodiment of the present invention.

Referring to FIG. 5, and continuing reference to FIG. 4, tucking apparatus 320 includes a groove perforation needle 325 and tucking plunger 330. Each of the needle 325 and plunger 330 are automated so as to actuate a rapid up and down plunging movement.

After the flaps 17 are directed through the flap folder 315, the needle 325 perforates the flap 17 and core material 10 to create a tucking groove 30 (FIG. 1) perforation line. A blunt plunger head 330 follows the perforation needle 325 to tuck covering material edge 19 (FIG. 1) into tucking groove 30 (FIG. 1). In an embodiment of the invention, a plurality of tucking apparatuses 320 may be used to reinforce tucking of the covering material edge 19 into tucking groove 30. In other embodiments of the present invention, multiple tucking apparatuses are implemented to form multiple tucked grooves for additional tucking of portions of the covering material 15 into the core material 10.

In further embodiments of the inventions, where the core material 10 is square or rectangular shaped, the covered core material 10 is rotated 90 degrees following initial tucking on opposite flaps 17. Unfolded opposite flaps 14 are folded and the covered core material similarly placed on conveyer 305 of the tucking station 300 to tuck flaps 14 with tucking apparatus 320. In such embodiment, the top and four side surfaces of the core material 10 are completely covered by covering material 15 and all four edges of the fabric covering material 15 are tucked into the bottom surface 11 of the core material 10.

Figure 6:
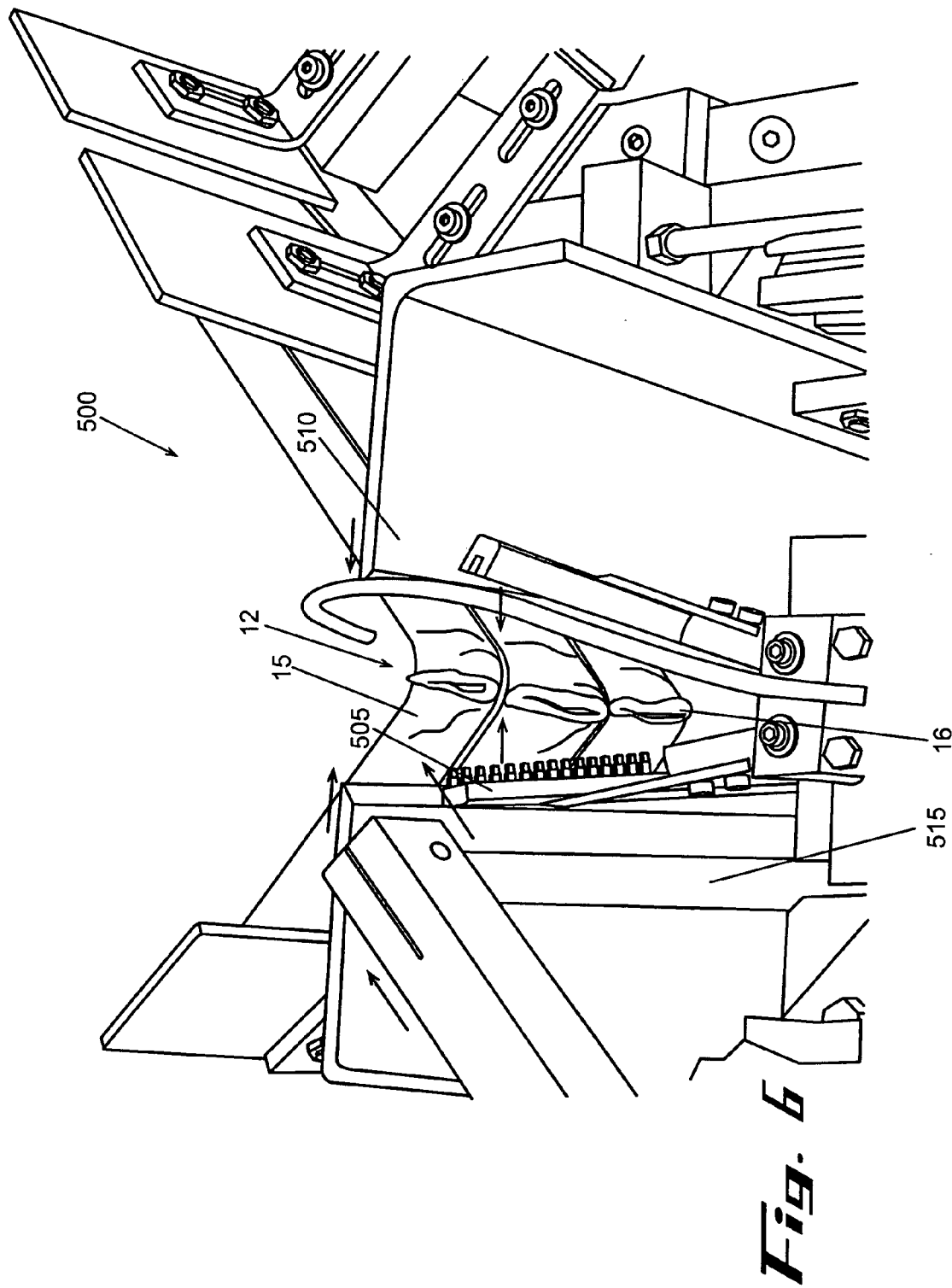
FIG. 6 is a perspective view of an excess fabric weld trimming station including pinchers, weld holders, and weld blade in an embodiment of the present invention.

Referring to FIG. 6, in an embodiment of the invention with fabric covering material 15 covering a corner 12 of the core material 10, and adjacent sides of the covering material tucked into a surface of the core material 10, excess fabric corner 16 will result at corner 12.

In embodiments of the invention, it is desirable to trim the excess fabric corner 16 at a corner weld and trimming station 500. The corner trimming station 500 includes actuated pinchers 505 that pinch excess fabric corner 16 and subsequently pull the excess fabric corner 16 outward from the core material corner 12. Corner weld holders 510 actuate to pinch and hold the excess fabric corner 16 at a point near the core material corner 12. An automatic trim weld blade 515 is actuated toward the pinched excess fabric corner 16 and the weld blade 515 welds the excess fabric corner 16, such as a fibrous woven or non-woven fabric, to create a welded tight, trimmed edge while the excess fabric corner 16 is burned off and discarded. In some instances, additional trimming, such as by hand, of the fabric welded corner may be necessary to achieve a smooth welded corner edge.

Referring to FIG. 7, in an embodiment of the invention wherein the reinforced article 5 is square or rectangular shaped, the corner trimming station 500 includes four sets of pinchers 505, weld holders 510, and weld blades 515. In this embodiment, the covered core material 10 is placed so that each corner is positioned between each set of pinchers 505, weld holders 510, and weld blades 515, to allow automatic welding and trimming of all four corners at once.

In a further embodiment, a plurality of covered core materials may be stacked to permit trimming of a plurality of stacked corners 12 simultaneously.

Figure 8:
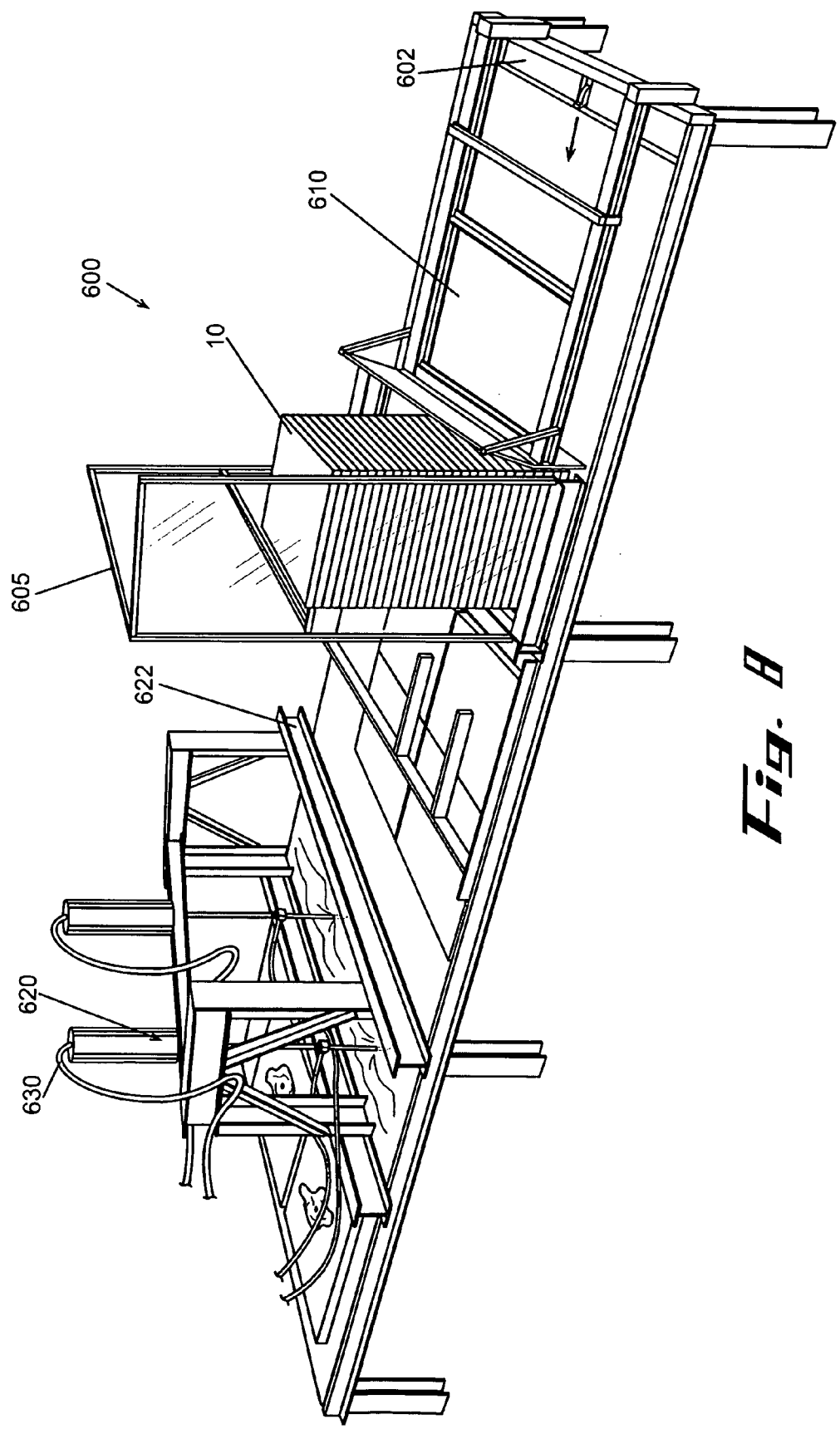
FIG. 8 is a top perspective view of a reinforcing layer injection station in an embodiment of the present invention.

Referring to FIG. 8, a reinforcing layer in injection station 600 is depicted with an injector 620 connected to a mixture supply line 630.

In an embodiment of the present invention, the injection station 600 includes a conveyor 602 to provide automated injection of a plurality of covered core materials 10.

In a further embodiment of the present invention, square or rectangular covered core materials 10 are stacked at a stacking partition 605 that aligns the stacked covered core material 10 for positioning on the conveyor 602 to the injector 620.

An indexer 610 is actuated in the line of conveyor movement toward the bottom covered core material 10 in the stack. The indexer 610 strikes the bottom covered core material 10 from the stack to propel it out of the stack and along the conveyor toward the injector 620. Gravity causes the remaining covered material 10 in the stack to move downward along the partition 605 when the indexer 610 retracts in a reverse direction from the movement of the conveyor 602.

It will be appreciated that in an embodiment of the present invention the covered core material propelled from the stack is covered facedown and the reverse face, facing upward, includes the bottom surface 11 tucked portions. Accordingly, the tucked face is exposed toward the injector 620.

The indexer 610 and injector 620 are in timed synchronization so that the indexer pushes the next covered core material 610 forward as the injector 620 lifts up and down to receive and pin the covered core material in the injector. Metal injector guide 622 preferably holds the covered core material in position for injection. Following injection of the inner reinforcing layer 20, the injection guides 622 retract upward to permit the next indexed covered material into the injector 620.

Figure 9:
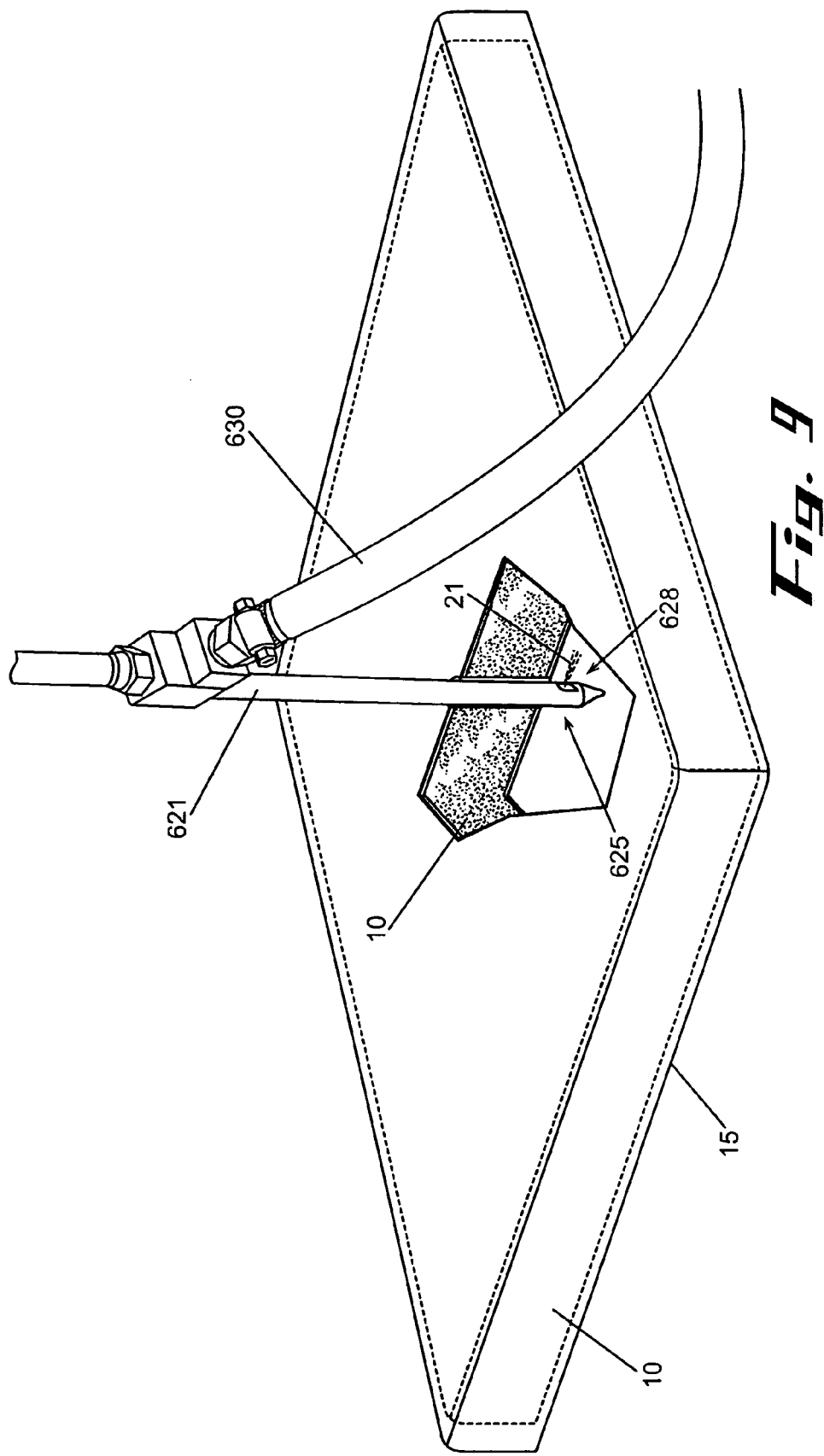
FIG. 9 is a perspective partial cut-away view of a covered core material being injected with an inner reinforcing layer mixture in an embodiment of the present invention.

Referring to FIG. 9, with continuing reference to FIG. 8, the injector includes an injection needle 625 and retracting needle arm 621. As the covered core material 10 is received by injector 620, needle arm 621 and needle 625 are lowered through the core material 10 until injection needle 625 is positioned so that injection hole 628 is positioned between the surface of the core material 10 and the covering material 15. The reinforcing mixture 21, such as cement slurry, is provided by a mixture feed line 630 connected to injection needle 625. The mixture 21 is injected in a desired metered amount, depending on the desired characteristics and thickness of the inner reinforcing layer 20.

Referring again to FIG. 8, in an embodiment of the invention, the injector 620 includes a vacuum base that removes excess water from the mixture 21 (FIG. 9) to form inner reinforcing layer 20 between the covering material 15 and the core material 10. In an additional embodiment, the injected mixture 21 includes a 1:1 cement/water ratio to promote dispersion. The increased water ratio, compared to typical cement mixtures, provides a better dispersion consistency for venting the reinforcing layer 20. The vacuum action acts to de-water the mixture 21 to solidify the injected cement mixture 21.

Once the desired inner reinforcing layer 20 is provided by the injection of mixture 21, the injector, including the injector guide 622, retractable needle arm 621 and needle 625, are lifted upward to permit the injected article 5 to be removed. As disclosed, the next covered core material 10 is indexed forward and the injector, including injector guide 622, needle arm 621 and injector needle 625, lowered to pin the covered core material 10 and repeat the process.

The reinforced article with inner injection layer 20 may be cured as desired.

In one embodiment, the covered core material 10 including the injected inner reinforcing layer 20 is further coated with an outer reinforcing mixture layer 25 (FIG. 1). The application of an outer reinforcing mixture layer 25 is well known in the art, and may include automated or by-hand application of a desirable outer reinforcing layer 25 to the outside of the covering material 15.

Referring to FIG. 10, in another embodiment of present invention, a solid textured layer 50 (FIG. 1) is further applied to the outer reinforcing mixture layer 25. At texturizer station 700 the covered core material 10, including inner and outer mixture layers, is moved along conveyor 701 beneath pad texturizer 705. Sand, or other desired solid texture substance, is disbursed by the rotating pad texturizer 705 to create a desired textured surface on reinforced article 5 (FIG. 1).

Accordingly, while the invention has been described with reference to the structures and processes disclosed, it is not confined to the details set forth, but is intended to cover such modifications or changes as may fall within the scope of the following claims.

What is claimed is:

1. A reinforced article of manufacture comprising:
   a. a foam core;
   b. a fabric layer covering at least one surface of the foam core,
      wherein one or more tucked portions of the fabric layer are tucked into the foam core; and
   c. an injected cementitious inner reinforcing mixture layer cured between the fabric covering and the at least one surface of the foam core.

2. The reinforced article of manufacture of claim 1 wherein the cementitious inner reinforcing mixture includes a compound selected from the group consisting of cement, concrete, plaster and paint.

3. The reinforced article of manufacture of claim 2 further comprising an outer reinforcing mixture layer deposited on the outer surface of the fabric layer.

4. The reinforced article of manufacture of claim 3 wherein a solid texture layer is deposited on top of the outer reinforcing mixture layer.

5. The reinforced article of manufacture of claim 3 wherein the outer reinforcing mixture layer mixture includes a compound selected from the group consisting of cement, concrete, plaster, and paint.

6. The reinforced article of manufacture of claim 5 wherein a solid texture layer is deposited on top of the outer reinforcing mixture layer.

7. The reinforced article of manufacture of claim 6 wherein the solid texture layer includes sand.

8. The reinforced article of manufacture of claim 1 further comprising an outer reinforcing mixture layer deposited on the outer surface of the fabric layer.

9. The reinforced article of manufacture of claim 8 further comprising a solid texture layer deposited on top of the outer reinforcing mixture layer.

10. The reinforced article of manufacture of claim 9 wherein the outer reinforcing mixture layer mixture includes a compound selected from the group consisting of cement, concrete, plaster, and paint.

11. The reinforced article of manufacture of claim 9 wherein the solid texture layer includes sand.

12. The reinforced article of manufacture of claim 1 wherein the one or more tucked portions of the fabric layer are tucked into one or more grooves penetrating the foam core.

13. The reinforced article of manufacture of claim 12 wherein the inner reinforcing mixture layer includes a compound selected from the group consisting of cement, concrete, plaster, and paint.

14. The reinforced article of manufacture of claim 13 further comprising an outer reinforcing mixture layer deposited on the outer surface of the fabric layer.

15. The reinforced article of manufacture of claim 1 wherein the foam core includes a top surface, a bottom surface, and four side surfaces, and wherein the fabric layer covers the top surface and four side surfaces, and wherein the tucked portions of the fabric layer are tucked into the bottom surface.

16. The reinforced article of manufacture of claim 15 further comprising an outer reinforcing mixture layer deposited on the outer surface of the fabric layer.

17. The reinforced article of manufacture of claim 16 wherein the inner reinforcing mixture layer includes a compound selected from the group consisting of cement, concrete, plaster, and paint.

18. The reinforced article of manufacture of claim 1 wherein the said at least one surface of the foam core includes one or more inner reinforcing mixture layer receiving channels.

19. The reinforced article of manufacture of claim 18 wherein the inner reinforcing mixture layer is an injected layer and includes a compound selected from the group consisting of cement, concrete, plaster, and paint.

20. The reinforced article of manufacture of claim 19 further comprising an outer reinforcing mixture layer deposited on the outer surface of the fabric layer.

21. The reinforced article of manufacture of claim 20 further comprising a solid texture layer deposited on top of the outer reinforcing mixture layer.

22. A reinforced article of manufacture comprising:
   a. a foam core;
   b. a fabric layer covering a first surface of the foam core, wherein one or more tucked portions of the fabric layer are tucked into a second surface opposite the first surface of the foam core; and
   c. an injected cementitious inner reinforcing mixture layer cured between the fabric layer and the first surface of the foam core.

23. The reinforced article of manufacture of claim 22 further comprising one or more welded fabric corners covering one or more corners of the foam core.

24. The reinforced article of manufacture of claim 22 wherein the first surface of the foam core includes one or more inner reinforcing mixture layer receiving channels.

25. The reinforced article of manufacture of claim 22 further comprising an outer reinforcing mixture layer deposited on the outer surface of the fabric layer.

26. The reinforced article of manufacture of claim 25 wherein the first surface of the foam core includes one or more inner reinforcing mixture layer receiving channels.

27. The reinforced article of manufacture of claim 26 wherein the outer reinforcing mixture layer includes a compound selected from the group consisting of cement, concrete, plaster, and paint, and wherein the injected inner reinforcing mixture layer Includes a compound selected from the group consisting of cement, concrete, plaster, and paint.

28. The reinforced article of manufacture of claim 27 further comprising a solid texture layer deposited on the outer reinforcing mixture layer.

* * * * *